United States Patent
Kulkarni et al.

(10) Patent No.: US 10,797,335 B2
(45) Date of Patent: *Oct. 6, 2020

(54) CONDUCTIVE SOLID OXIDE FUEL CELL ELECTROLYTE COMPOSITION AND A METHOD FOR PREPARING THE SAME

(71) Applicants: Secretary, Department Of Electronics And Information Technology (Deity), New Delhi (IN); Executive Director General, Centre For Materials For Electronics Technology, Pune, Maharashtra (IN)

(72) Inventors: Shrikant Kulkarni, Maharashtra (IN); Siddhartha Duttagupta, Maharashtra (IN); Girish Phatak, Maharashtra (IN)

(73) Assignees: SECRETARY, DEPARTMENT OF ELECTRONICS AND INFORMATION TECHNOLOGY (Deity), New Delhi (IN); EXECUTIVE DIRECTOR, CENTRE FOR MATERIALS FOR ELECTRONICS TECHNOLOGY, Maharashtra (IN)

( * ) Notice: Subject to any disclaimer, the term of this patent is extended or adjusted under 35 U.S.C. 154(b) by 43 days.

This patent is subject to a terminal disclaimer.

(21) Appl. No.: 15/578,700

(22) PCT Filed: Jan. 13, 2016

(86) PCT No.: PCT/IB2016/050130
§ 371 (c)(1),
(2) Date: Nov. 30, 2017

(87) PCT Pub. No.: WO2016/193827
PCT Pub. Date: Dec. 8, 2016

(65) Prior Publication Data
US 2018/0166723 A1 Jun. 14, 2018

(30) Foreign Application Priority Data

Jun. 1, 2015 (IN) .......................... 1573/DEL/2015

(51) Int. Cl.
*H01M 8/126* (2016.01)
*C04B 35/50* (2006.01)
(Continued)

(52) U.S. Cl.
CPC .......... *H01M 8/126* (2013.01); *C01F 17/206* (2020.01); *C03C 14/00* (2013.01); *C03C 14/006* (2013.01);
(Continued)

(58) Field of Classification Search
CPC ..................................................... H01M 8/126
See application file for complete search history.

(56) References Cited

U.S. PATENT DOCUMENTS

2009/0197135 A1* 8/2009 Querel ................ H01M 8/0282
429/460
2012/0231366 A1 9/2012 Wachsman et al.

FOREIGN PATENT DOCUMENTS

JP 2014240339 A * 12/2014
KR 20110083371 A 7/2011
WO 2012-138403 A2 10/2012

* cited by examiner

*Primary Examiner* — Jonathan G Jelsma
(74) *Attorney, Agent, or Firm* — Umberg Zipser LLP

(57) ABSTRACT

The present disclosure relates to a conductive Solid Oxide Fuel Cell (SOFC) electrolyte composition that is compatible with Low Temperature Co-fired Ceramic (LTCC). The conductive SOFC electrolyte composition comprises gadolinium doped ceria, glass composite and additives. The conductive SOFC electrolyte composition is physically and chemically compatible with the LTCC. A process for pre- (Continued)

paring a conductive SOFC electrolyte composition is also provided in the present disclosure.

8 Claims, 3 Drawing Sheets

(51) Int. Cl.
*C03C 14/00* (2006.01)
*C04B 35/636* (2006.01)
*C04B 35/632* (2006.01)
*C01F 17/206* (2020.01)
*H01M 8/124* (2016.01)

(52) U.S. Cl.
CPC ............ *C04B 35/50* (2013.01); *C04B 35/632* (2013.01); *C04B 35/636* (2013.01); *C04B 35/6365* (2013.01); *C04B 2235/3224* (2013.01); *C04B 2235/3229* (2013.01); *C04B 2235/36* (2013.01); *C04B 2235/6026* (2013.01); *C04B 2235/77* (2013.01); *C04B 2235/9607* (2013.01); *H01M 2008/1293* (2013.01); *Y02E 60/525* (2013.01); *Y02P 70/56* (2015.11)

CONDUCTIVE SOLID OXIDE FUEL CELL ELECTROLYTE COMPOSITION AND A METHOD FOR PREPARING THE SAME

FIELD

The present disclosure relates to a conductive Solid Oxide Fuel Cell (SOFC) electrolyte composition that is compatible with the casing material.

BACKGROUND

Low Temperature Co-fired ceramic (LTCC) devices are monolithic, ceramic microelectronic devices where the entire ceramic support structure and any conductive, resistive, and dielectric materials are fired in a kiln at the same time. Typical devices include capacitors, inductors, resistors, transformers, and hybrid circuits. The technology is also used for a multi-layer packaging in the electronics industry, such as military electronics, micro electro mechanical system (MEMS), microprocessor and radio frequency (RF) applications.

Low temperature co-fired ceramic (LTCC) is well known as a packaging technology used for packaging integrated circuits (IC), monolithic microwave integrated circuits (MMIC), sensors, and to fabricate multi-chip modules (MCM). The capability of making three-dimensional structures and to handle mechanical, electrical, optical and microfluidic signals, extends the usefulness of LTCC to MEMS devices and their packaging.

One of the major advantages of LTCC is its capability to accommodate embedded lumped passive components within the multi-layer circuit. Small sized Solid Oxide Fuel Cells (SOFCs) are one of the most promising candidates for in situ power generation. SOFCs can generate power efficiently, can be operated using various fuels such as alcohol, hydrogen, ether, methane and are also environmentally clean. However, SOFCs require high operating temperature. Integration of SOFCs with LTCC requires reduction in the operating temperature of the SOFCs while maintaining the optimum conductivity.

Conventional solid oxide fuel cells (SOFCs) comprise an electrolyte and two electrodes in a stainless steel (SS) housing/casing. Typically, the electrodes are made of platinum plates and the electrolyte is semi-solid in nature. The conventional SOFCs generally have an efficiency of about 300 mW/cm$^2$ of the cell. The electrolyte made of ceramic material is not compatible with the traditional SS casing of the SOFCs, resulting in improper sealing between the electrolyte and the casing. The improper sealing between the electrolyte and the casing results in leakage of gases from the SOFCs, deterioration of the SOFCs and lowering of the efficiency of the SOFC, since optimum power cannot be drawn from the SOFC.

Therefore, there is felt need for a conductive solid oxide fuel cell electrolyte composition that is compatible with the SOFC casing material.

Objects

Some of the objects of the present disclosure, which at least one embodiment herein satisfies, are as follows:

It is an object of the present disclosure to ameliorate one or more problems of the conventional SOFC electrolyte and the casing material or to at least provide a useful alternative.

An object of the present disclosure is to provide a conductive SOFC electrolyte composition that is physically and chemically compatible with the casing material.

Another object of the present disclosure is to provide a conductive SOFC electrolyte composition that can be integrated in the casing material.

Still another object of the present disclosure is to provide a conductive SOFC electrolyte composition having lower sintering temperature and that can be co-fired with the casing material.

Yet another object of the present disclosure is to provide a method for preparing a conductive SOFC electrolyte composition.

Other objects and advantages of the present disclosure will be more apparent from the following description when read in conjunction with the accompanying figures, which are not intended to limit the scope of the present disclosure.

SUMMARY

In accordance with an aspect of the present disclosure there is provided a conductive solid oxide fuel cell electrolyte composition. The composition comprises 73 wt % to 77.5 wt % of gadolinium doped ceria and 22.5 wt % to 27 wt % of glass composite. The glass composite comprises 95 wt % to 99 wt % bismuth oxide and 1 wt % to 5 wt % potassium oxide. The physical and chemical properties of the conductive solid oxide fuel cell electrolyte composition are compatible with the physical and chemical properties of the casing material.

In accordance with another aspect of the present disclosure there is provided a method for preparing a conductive SOFC electrolyte composition. The method comprises grinding gadolinium doped ceria and glass composite to obtain a first mixture. Additives are added to the first mixture in a pre-determined amount and a pre-determined sequence, and mixed thoroughly to obtain a second mixture. The second mixture is allowed to stand for 12 to 18 hours and then mixed again to obtain a homogenized mixture of the conductive SOFC electrolyte composition.

BRIEF DESCRIPTION OF THE ACCOMPANYING DRAWINGS

Figure 4:
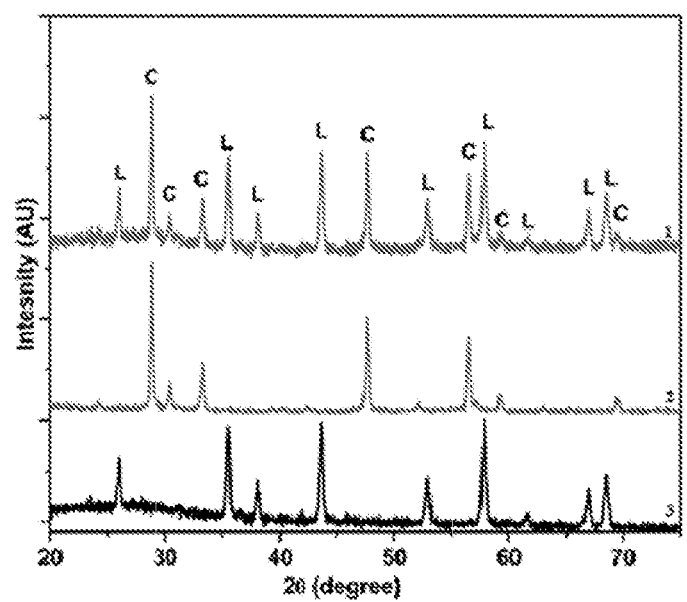
Figure 5:
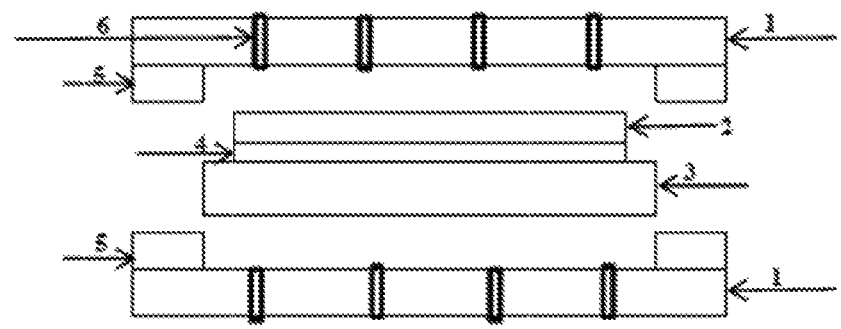

FIG. 4 illustrates an X-ray Diffraction pattern of the conductive SOFC electrolyte composition of the present disclosure, LTCC casing material and the conductive SOFC electrolyte composition printed on the LTCC casing material; and FIG. 5 illustrates a schematic representation of a solid oxide fuel cell (SOFC) having the conductive SOFC electrolyte composition of the present disclosure and LTCC casing material.

DETAILED DESCRIPTION

Electrolytes and electrodes are solid oxide fuel cell (SOFC) components made up of oxide materials that require high sintering temperature. The SOFC materials are pure ceramics, are ionic and mixed conductors, sintered at temperatures above 1200° C., operate at 800° C. to 1000° C. and show shrinkage of about 14%. The SOFC electrolyte is not compatible with the conventional stainless steel (SS) casing. The incompatibility of the electrolyte and the SS casing results in improper sealing and leakage of gases from the SOFCs. Glass sealants have been used to stop the leakage of gas, however, these glass sealants are not compatible with the electrolyte and the casing material resulting in mechanical stress/strain during the operation, hairline cracks in the casing and lowering of the life of the SOFCs.

Accordingly, in an aspect of the present disclosure there is provided a conductive SOFC electrolyte composition. The materials are selected based on their chemical and physical compatibilities with each other and with the casing of the solid oxide fuel cell.

The inventors of the present disclosure have found an SOFC electrolyte that is compatible with the casing material i.e. low temperature co-fired ceramics (LTCC). The LTCC materials are highly insulating and chemically inert glass-ceramics which are sintered below 900° C., show shrinkage of about 12% to 13% and can be operated up to 600° C. The glass-ceramic LTCC typically comprises about 50% silicon oxide, 45% aluminum oxide and 4% to 5% organic material. Conventionally, the physical, chemical and electrical properties of materials used for SOFC and LTCC are different. However, there are many advantages of integrating SOFC and LTCC materials and processes, such as, easy fabrication of microfluidic channels, buried heaters and temperature sensors, connection of metallic tubing by brazing, well developed sealing technology, and use of the thick film technology for fabrication.

The conductive SOFC electrolyte composition in accordance with the present disclosure comprises gadolinium doped ceria and glass composite.

In an embodiment of the present disclosure, the proportion of gadolinium doped ceria in the conductive SOFC electrolyte composition is in the range of 73 wt % to 77.5 wt %.

Ceria in its pure form is insulating due to the unavailability of oxygen ion vacancies. When trivalent lanthanide such as gadolinium (Gd) is added to ceria, oxygen vacancies are created at the octahedral sites due to the replacement of $Ce^{4+}$ ions that enable oxygen ion conduction by ion hopping mechanism in the temperature range of 600° C. to 800° C. A high sintering temperature of 1350° C. is required to obtain gadolinium doped ceria having high density (>94%).

A sintering aid (glass composite) is added that lowers the sintering temperature of SOFC electrolyte in the range of the casing material firing temperature. In an embodiment of the present disclosure, the sintering aid is a glass composite comprising bismuth oxide and potassium oxide. The proportion of the glass composite in the SOFC electrolyte composition is in the range of 22.5 wt % to 27 wt %. The glass composite in accordance with the present disclosure comprises 95 wt % to 99 wt % bismuth oxide and 1 wt % to 5 wt % potassium oxide.

Bismuth oxide has a melting point around 817° C. and forms oxygen ion conducting phases in the temperature range of 400° C. to 600° C. Potassium oxide, an alkali oxide helps in improving the ionic conductivity. The glass composite also helps in improving the shrinkage of the SOFC electrolyte at the lower operating temperature. The glass composite is chemically stable and hence, does not react with the ceramic matrix of the LTCC.

The conductive SOFC electrolyte composition of the present disclosure has a thermal expansion coefficient in the range of 5.80 ppm/° C. to 7.00 ppm/° C. and shrinkage in the range of 12% to 13%.

The casing material used in one embodiment of the present disclosure is DuPont 951 LTCC tape, having thermal expansion coefficient of 5.80 ppm/° C. and shrinkage in the range of 12% to 13%. The physical and chemical properties of the conductive SOFC electrolyte composition of the present disclosure and the casing material (DuPont 951 LTCC tape) are compatible with each other, resulting in an SOFC having higher efficiency, minimum leakage, higher life and reduced dimensions.

In another aspect of the present disclosure, there is provided a process for preparing the conductive SOFC electrolyte composition. The process comprises the following steps:

Initially, gadolinium doped ceria and glass composite are grinded together to obtain a first mixture.

In an embodiment of the present disclosure, 73 wt % to 77.5 wt % of gadolinium doped ceria and 22.5 wt % to 27 wt % of glass composite are ground together. In another embodiment of the present disclosure, the glass composite comprises 95 wt % to 99 wt % of bismuth oxide and 1 wt % to 5 wt % of potassium oxide.

The gadolinium doped ceria is prepared by mixing cerium nitrate and gadolinium nitrate to obtain a mixture, glycine is added to the mixture to obtain a solution. The solution is stirred for a period ranging from 12 hours to 36 hours and then heated in the temperature range of 50° C. to 80° C. to obtain a viscous solution. The viscous solution so obtained is heated in the temperature range of 200° C. to 300° C. to obtain a powdered mass. The powdered mass is sintered in the temperature range of 700° C. to 900° C. for a period ranging from 3 hours to 6 hours to obtain the gadolinium doped ceria.

The glass composite is prepared by mixing the bismuth oxide and potassium oxide to obtain a mixture. In an embodiment of the present disclosure potassium carbonate is taken as a precursor for potassium oxide. Acetone is added to the mixture and milled for a period ranging from 48 hours to 90 hours to obtain a milled mixture. The milled mixture is dried to obtain a dried mass. The dried mass is calcined in the temperature range of 700° C. to 1100° C. for a period ranging from 30 minutes to 120 minutes to obtain a molten mass. The molten mass is quenched in water to obtain glass frit and finally, the glass frit is milled to obtain the glass composite in powdered form.

Next, additives are added to the so obtained first mixture of gadolinium doped ceria and glass composite and mixed to obtain a second mixture. The additives, in accordance with the present disclosure are viscosity adjustment agents (15 wt % to 20 wt %), dispersants (8 wt % to 10 wt %), thixotropic agents (4 wt % to 6 wt %) and binders (7 wt % to 9 wt %).

In an embodiment of the present disclosure the viscosity adjustment agent is an alcohol selected from the group consisting of ethanol, propanol, butanol and amyl alcohol. The viscosity adjustment agent helps in maintaining the viscosity of the electrolyte composition in the range of 65 poise to 75 poise.

In another embodiment of the present disclosure an edible oil is used as a dispersant, preferably sunflower oil. Use of the dispersant does not allow the fine particles in the electrolyte composition to settle down.

In another embodiment of the present disclosure, the thixotropic agent is selected from the group consisting of ethylene glycol, amyl acetate, butyl acetate and propyl acetate. The thixotropic agent helps in spreading the electrolyte evenly without breakages.

In another embodiment of the present disclosure, the binder is a mixture of ethyl cellulose and β-terpineol.

The second mixture obtained above is allowed to stand for a time period ranging from 12 hours to 18 hours. The second mixture is further mixed thoroughly to obtain a homogenized mixture of the conductive SOFC electrolyte composition.

The conductive SOFC electrolyte composition can be prepared in the form of paste, tape and thick film.

The additives are added while preparing the conductive SOFC electrolyte composition, however, during the co-firing of the electrolyte composition at the high temperature of above 450° C., these additives get vaporized and thus, are not present in the final conductive SOFC electrolyte composition.

The conductive SOFC electrolyte composition obtained is deposited on a low temperature co-fired ceramic tape by a method selected from the group consisting of screen printing, lithography and thin film deposition, preferably by screen printing.

In a preferred embodiment of the present disclosure, the commercially available LTCC tape "DuPont 951 LTCC tape" is used as the casing material for the conductive SOFC electrolyte composition.

It is observed that no chemical reaction takes place between the conductive SOFC electrolyte composition and the LTCC tape (anode), during co-firing of the conductive SOFC electrolyte composition with the LTCC. An adhesive reaction takes place between the conductive SOFC electrolyte composition and the LTCC tape during the co-firing step. The LTCC tape softens during the co-firing and cavities of about 15 microns, are formed on the tape. The conductive SOFC electrolyte composition, having much smaller particle size than 15 microns fills the cavities on the LTCC tape. There is no breaking of the surface tension, and the integrity of the electrolyte and the LTCC tape is maintained. This ensures that the shrinkage level of the conductive SOFC electrolyte composition and the LTCC tape is matched and there is no warpage observed.

After co-firing the conductive SOFC electrolyte composition and the LTCC tape, a low temperature curing is carried out, typically in the temperature range of 60° C. to 80° C. In an embodiment of the present disclosure, the low temperature curing is carried out using air drying, oven drying, tray drying or infrared (IR) radiation.

The present disclosure is further described in light of the following experiments which are set forth for illustration purpose only and not to be construed for limiting the scope of the disclosure. These laboratory scale experiments can be scaled up to industrial/commercial scale.

Experiment 1: Preparing Conductive SOFC Electrolyte Composition

Glass composite was mixed with Gadolinium doped ceria and grinded, followed by the addition of additives to obtain a mixture. The amount and sequence of additives is given below in Table-1. The mixture obtained was mixed well and then allowed to stand and then was further thoroughly mixed to obtain a homogenized mixture of the conductive SOFC electrolyte composition.

TABLE 1

| S. No. | Composition | Function | Wt % of the composition |
|---|---|---|---|
| 1. | Gadolinium doped ceria | Inorganics | 45 |
| 2. | Glass composite | | 20 |

TABLE 1-continued

| S. No. | Composition | Function | Wt % of the composition |
|---|---|---|---|
| 3. | Ethanol | Viscosity adjustment agent | 15 |
| 4. | Sunflower oil | Dispersant | 8 |
| 5. | Ethyl cellulose | Binder | 2 |
| 6. | β-terpineol | Binder | 5 |
| 7. | Amyl acetate | Thixotropic agent | 3 |
| 8. | Ethylene glycol | Thixotropic agent | 2 |

The properties of the conductive SOFC electrolyte composition of the present disclosure are summarized below in Table-2.

TABLE 2

| S. No. | Property | Value |
|---|---|---|
| 1. | Viscosity (Brookfield) | 70 to 80 poise |
| 2. | Shrinkage | 12 to 13% |
| 3. | Thermal expansion coefficient | 5.96 ppm/° C. |
| 4. | Warpage | 0.8 to 1.2 micrometers |
| 5. | Printed thickness | 18 to 20 micrometers |
| 6. | Fired thickness | 12 to 15 micrometers |

Screen Printing the Conductive SOFC Electrolyte Paste on LTCC Tape

The homogenized paste of SOFC electrolyte obtained was used for screen printing on DuPont 951 LTCC tape. The specifications of the screen used for printing is given below in Table-3.

TABLE 3

| Parameter | Value |
|---|---|
| Mesh count | 635 mesh count |
| Wire diameter | 15 micrometers |
| Plain weave | 45° |
| Mesh tension/Deflection | 27 N/cm |

Figure 1:
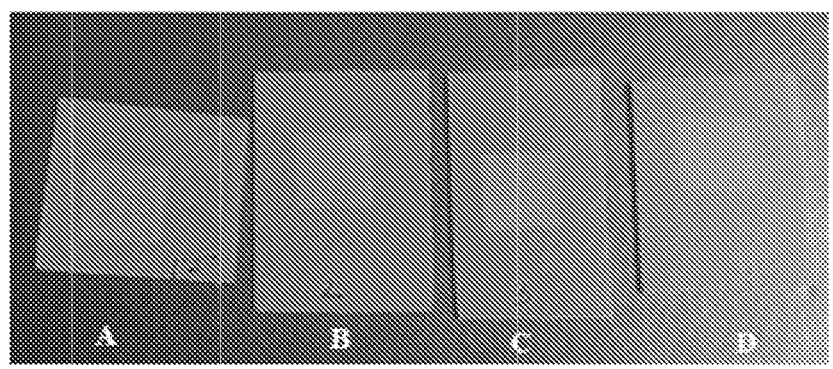
FIG. 1 illustrates screen printed conductive SOFC electrolyte composition prepared in accordance with the present disclosure on LTCC casing material having different thickness.
Figure 2:
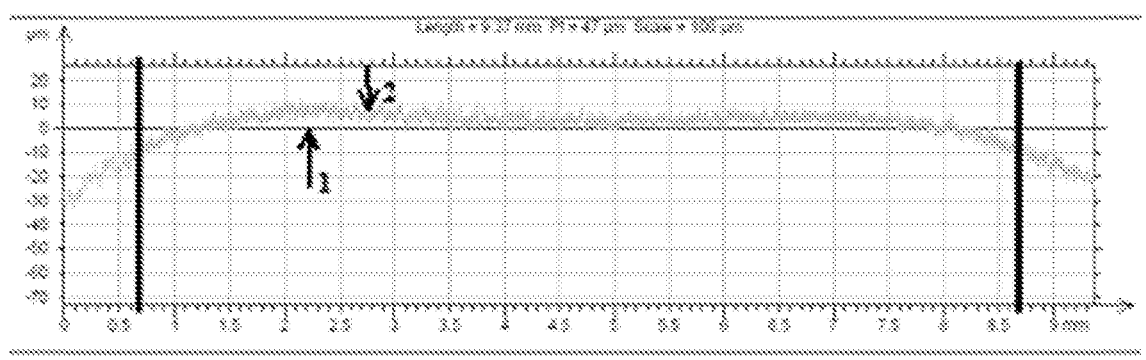
FIG. 2 illustrates a graphical representation of a line scan of a conductive SOFC electrolyte composition printed on LTCC casing material having 100 microns thickness.
Figure 3:
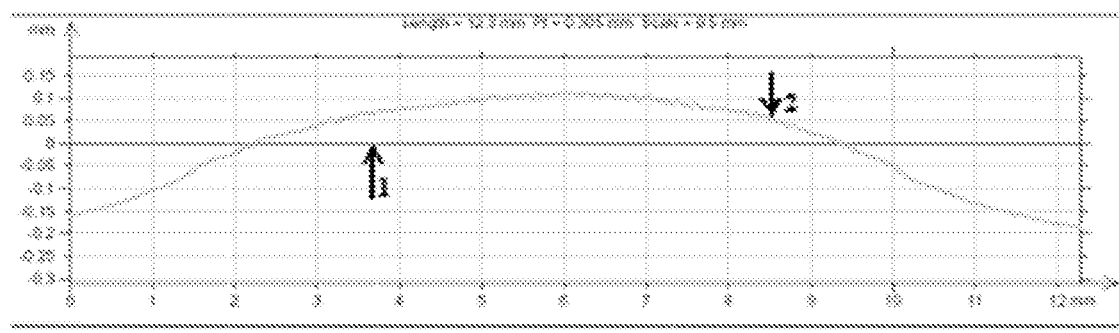
FIG. 3 illustrates a graphical representation of a line scan of a commercially available SOFC electrolyte.

FIG. 1 depicts the conductive SOFC electrolyte composition prepared in accordance with the present disclosure, printed on LTCC casing material tape having different thickness. The thickness of the conductive SOFC electrolyte composition was 20 microns, and the thickness of the LTCC casing material was 150 microns (A), 200 microns (B), 300 microns (C) and 400 microns (D). A uniform thickness was obtained when the conductive SOFC electrolyte composition of the present disclosure was printed on the LTCC casing material. The SOFC paste printed on LTCC tape also shows thixotropic properties. Line scan of the screen printed conductive SOFC electrolyte composition on 100 micrometers LTCC tape shows zero warpage as illustrated in FIG. 2. Line-1 in FIG. 2 is the line scan of LTCC casing material after firing and Line-2 is the line scan of conductive SOFC electrolyte of the present disclosure. Line-2 in FIG. 3 is the line scan of commercial SOFC electrolyte and Line-1 is the line scan of the LTCC casing material after firing. As seen from FIG. 2 the warpage of the conductive SOFC electrolyte of the present disclosure was considerably reduced as compared to the commercial SOFC electrolyte. Also, the shrinkage of the conductive SOFC electrolyte of the present disclosure and the LTCC casing material was similar.

Electrolyte and electrodes are important components of the solid oxide fuel cells. All these components in the SOFC are made up of ceramic (oxide) materials. As mentioned previously, these materials require high sintering temperature, which is usually above 1200° C. Their physical properties, such as, shrinkage, thermal expansion coefficient (TEC), thermal conductivities and the like are dependent on the constituent materials. Especially, being a ceramic material these have high TEC values and low thermal conductivity. On the other hand, LTCC is a glass ceramic which has low sintering temperature and low TEC values. Table-4 summarizes a comparison of the physical properties of a typical SOFC and LTCC materials.

TABLE 4

| Physical Properties | SOFC Material | LTCC Material (DuPont 951) |
| --- | --- | --- |
| Materials type | Ceramics | Glass-ceramics |
| Sintering temperature (° C.) | >1200 | 875 |
| Operating temperature (° C.) | 800 to 1000 | 600 |
| TEC (ppm/° C.) | >12 | 5.8 |
| Thermal conductivity (W/mK) | 1 to 2 | 3.0 |
| Density (gms · cm$^{-3}$) | >6 | 3.1 |
| Shrinkage (%) | 14% @1350° C. | 12.9% @ 875° C. |

X-ray diffraction pattern of the conductive SOFC electrolyte composition of the present disclosure (Line-2), the LTCC casing material (Line-3) and the conductive SOFC electrolyte composition printed on the LTCC casing material (Line-1) is illustrated in FIG. 4. It is seen from FIG. 4 that the conductive SOFC electrolyte composition printed on the LTCC casing material (Line-1) showed all the peaks which were present individually for the conductive SOFC electrolyte composition (Line-2) and the LTCC casing material (Line-3), without any additional peaks being formed. This confirms that the screen printed conductive SOFC electrolyte composition does not react with the LTCC tape during the co-firing process and hence, there were no additional phases formed as a result of the co-firing process, also implying chemical compatibility between the conductive SOFC electrolyte composition and the casing material (LTCC).

Comparative Experiment

In this experiment the compatibility of the electrolyte and the casing material was studied and the results are summarized in Table-5 below.

TABLE 5

| Casing material + Electrolyte material | Efficiency (%) | Gas leakage (%) | Operating temperature (° C.) | Minimum possible dimensions (mm) | Life |
| --- | --- | --- | --- | --- | --- |
| SS casing + ceramic materials | 60 | 15 | 800 | 100 × 100 × 100 | 5 |
| LTCC casing + ceramic materials | (LTCC casing will not work at 800° C. operating temperature for conventional ceramic electrolyte) | 10 | 800 | — | 1 |
| LTCC casing + glass-ceramic materials (present disclosure) | 85 | 1 | 600 | 50 × 50 × 50 | 10 |

It is seen clearly from Table-5 that higher efficiency (85%) was achieved when LTCC casing was used along with the conductive SOFC electrolyte composition of the present disclosure. The leakage of gas was reduced significantly and an operating temperature of 600° C. was possible when the conductive SOFC electrolyte of the present disclosure was used with the LTCC casing. An improvement in the life of the SOFC was also observed, it is also possible to minimize the dimensions of SOFCs using the conductive SOFC electrolyte composition along with the LTCC casing.

A typical configuration of a solid oxide fuel cell using the conductive SOFC electrolyte composition of the present disclosure and using a LTCC casing is illustrated in FIG. 5 comprising the LTCC casing 1, an anode 3 in the form of a tape having thickness of 60 microns, a cathode 2 in the form of thick film having thickness of 30 microns and an electrolyte 4 in the form of thick film having thickness of 20 microns disposed between the cathode and the anode. The LTCC casing 1 has metallic interconnects 6 to collect current generated at the electrodes. Glass sealants 5 were used to carry out the sealing at the periphery of the two sides of the LTCC casing 1.

The glass sealant used in the SOFC cell is the commercially available glass paste DuPont 9616. This glass sealant is co-firable with LTCC DuPont 951 tape. All the physical properties of the glass sealant match with that of the LTCC tape. The glass sealant provides hermetic sealing of the LTCC packages/casings, having leakages below $10^{-9}$ mbar l/hours. In the conventional SS casing, different glass sealants based on $CaO$—$BaO$—$B_2O_3$—$Al_2O_3$—$SiO_2$ oxides are used however, these sealants have leakage problems.

Using the conductive SOFC electrolyte composition of the present disclosure and the LTCC casing material, which are physically and chemically compatible with each other results in higher efficiency of the solid oxide fuel cell is achieved. Further, the leakage of gas is also reduced and the life of the SOFC cell is increased. It is also possible to minimize the dimensions of the solid fuel oxide cell using the conductive SOFC electrolyte composition of the present disclosure and the LTCC casing material.

Technical Advancements and Economical Significance

The technical advancements offered by the present disclosure include the realization of:

A conductive SOFC electrolyte composition that is physically and chemically compatible with the casing material;

A conductive SOFC electrolyte composition having thermal expansion coefficient and shrinkage values that are comparable with the casing material thereby having reduced warpage and leakage problems as compared to conventional casing material;

A conductive SOFC electrolyte composition having a lowered sintering temperature and that can be integrated with the casing material to obtain high efficiency and comparatively higher useful life.

The terminology used herein is for the purpose of describing particular example embodiments only and is not intended to be limiting. As used herein, the singular forms "a", "an" and "the" may be intended to include the plural forms as well, unless the context clearly indicates otherwise.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form part of the prior art base or were common general knowledge in the field relevant to the disclosure as it existed anywhere before the priority date of this application.

Wherever a range of values is specified, a value up to 10% below and above the lowest and highest numerical value respectively, of the specified range, is included in the scope of the disclosure.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A conductive solid oxide fuel cell (SOFC) electrolyte composition, said composition comprising:
   a. gadolinium doped ceria; and
   b. glass composite,
   wherein, the conductive SOFC electrolyte composition is physically and chemically compatible with the casing material of the SOFC; and
   wherein the glass composite comprises 95 wt % to 99 wt % bismuth oxide with respect to the total weight of glass composite and 1 wt % to 5 wt % potassium oxide with respect to the total weight of glass composite.

2. The conductive solid oxide fuel cell electrolyte composition as claimed in claim 1, wherein the casing material is a low temperature co-fired ceramics (LTCC) material.

3. The conductive solid oxide fuel cell electrolyte composition as claimed in claim 2, wherein the casing material has a thermal expansion coefficient of 5.8 ppm/° C.; and shrinkage in the range of 12% to 13% of the initial value.

4. The conductive solid oxide fuel cell electrolyte composition as claimed in claim 1, wherein the electrolyte composition has a thermal expansion coefficient in the range of 5.80 ppm/° C. to 7.00 ppm/° C.; and shrinkage in the range of 12% to 13% of the initial value.

5. The conductive solid oxide fuel cell electrolyte composition as claimed in claim 1, wherein the casing material has a thermal expansion coefficient of 5.8 ppm/° C.; and shrinkage in the range of 12% to 13% of the initial value.

6. The conductive solid oxide fuel cell electrolyte composition as claimed in claim 1, wherein the amount of gadolinium doped ceria in the electrolyte composition is in the range of 73 wt % to 77.5 wt % with respect to the total weight of the electrolyte composition and the amount of glass composite is in the range of 22.5 wt % to 27 wt % with respect to the total weight of the electrolyte composition.

7. The conductive solid oxide fuel cell electrolyte composition as claimed in claim 1, wherein the electrolyte composition is in the form of paste, tape or thick film.

8. The conductive solid oxide fuel cell electrolyte composition as claimed in claim 1, wherein the electrolyte composition is deposited on a low temperature co-fired ceramic tape by a method selected from the group consisting of screen printing, lithography and thin film deposition.

* * * * *